Figures 1, 2:
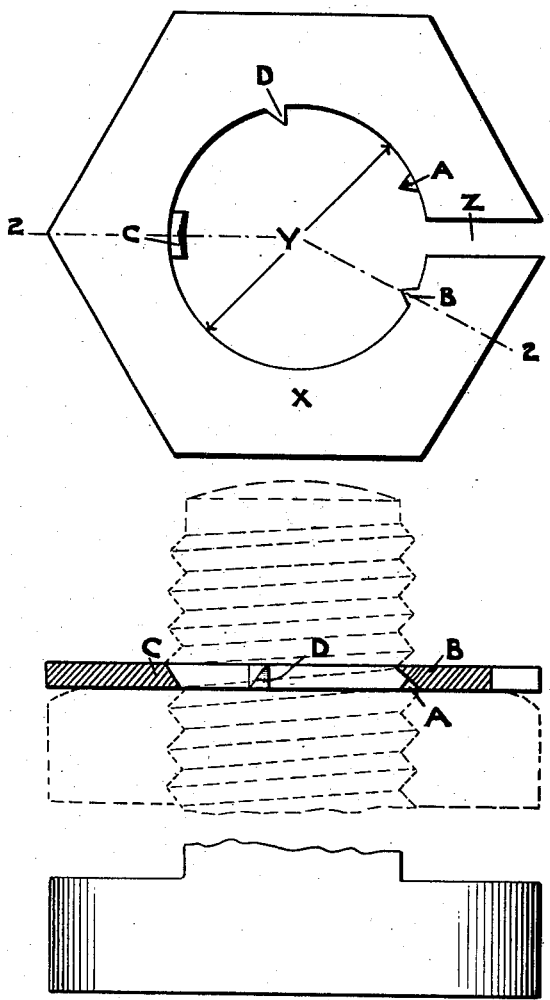

G. S. NORRIS.
LOCK NUT.
APPLICATION FILED DEC. 15, 1911.

1,069,024.

Patented July 29, 1913.

UNITED STATES PATENT OFFICE.

GEORGE SOMERVILLE NORRIS, OF BRISBANE, QUEENSLAND, AUSTRALIA, ASSIGNOR TO NORRIS NUT LOCK CO., LIMITED, OF MARYBOROUGH, QUEENSLAND, AUSTRALIA.

LOCK-NUT.

1,069,024.      Specification of Letters Patent.      Patented July 29, 1913.

Application filed December 15, 1911. Serial No. 666,053.

*To all whom it may concern:*

Be it known that I, GEORGE SOMERVILLE NORRIS, a citizen of the United States of America, residing at Brisbane, in the State of Queensland, Commonwealth of Australia, mechanician, have invented certain new and useful Improvements in Lock-Nuts; and I do hereby declare the following to be a full, clear, and exact description of the invention, such as will enable others skilled in the art to which it appertains to make and use the same.

My invention relates to means for preventing the nuts on bolts from working or slackening back. I am aware that very many devices exist for this purpose, but have no knowledge of any bearing any similarity to mine.

My invention consists of a lock nut or washer made slightly larger than the bolt it has to fit and provided with four points specially located which project inwardly and engage, but do not necessarily fit, the screw, between two or more threads. In order however that my invention may be more clearly understood I will now describe same with reference to the accompanying drawings in which, Figure 1 is a plan of my lock nut or washer, and Fig. 2 is a sectional elevation on the line 2—2, showing the inclination of the points that engage the threads.

The lock nut or washer X is made thin like an ordinary washer but slotted as at Z, the diameter Y being made just to clear the thread. The point A, I place on one side of the slot Z and the point B on the other, and exactly opposite the slot Z I place the chisel point C. This chisel point C is larger than the others and has the front edge curved to fit the bottom of the thread. The point D is placed between the points A and C. The point A and the chisel point C lie flush with one surface of the washer X, and the points B and D lie flush with the opposite surface. The various points are shaped as follows:—The points A B D are approximately triangular in plan, and the point C approximately as shown. Furthermore the points A C are beveled upward and outward from the bottom of the lock nut or washer to the top. The points B D are beveled in the opposite direction.

I do not bind myself to the exact dimensions to be observed in making my lock nut or washer nor to any definite positions of the points A, B, C, D, as I find that these may be varied, within reasonable limits, without affecting the working thereof, but the following information may be of use in making my lock nut or washer. Thickness of lock nut or washer X to be about or slightly more than three times the pitch of the thread. Diameter of hole Y to be slightly greater than diameter of bolt. Slot Z—the width to be about one-eighth the diameter of bolt. Point C to be half as wide again as the slot Z. Points A B to be placed as far from the slot Z as the width of the slot. Point D to be placed midway between the points A and C.

It will be readily seen from the relative positions of the points A and C that when properly threaded on the bolt the washer will always carry the point A in advance of the point C; so that when any pressure of the nut, due to an attempt to unscrew from the bolt, is felt upon the washer, this pressure will exert its influence greatest first at the point A, which will cause the beveled inner face of the latter to coact with the beveled face of the wall of the thread to force that portion of said washer carrying the point A upwardly and consequently into a slightly canted position. This action shifts the pressure of the nut on the side of the washer diametrically opposite the point A at which, substantially, is located the guide point C, the inner face of which in like manner, coacts with its thread to ride up thereon developing thereby a tendency to restore the washer from its slightly canted position. This canting is further opposed by the presence of the point D on the opposite face of the washer and situated substantially midway between the points A and C, the straight outer wall of which point D coacts with the thread to aid in resisting any substantial movement of the washer in a direction at right angles to the thread. As the pressure from the nut increases, the more will the points A and C tend to ride toward the crest of their respective threads, thereby creating an opposite and practically equal strain acting in a direction radially from each of said points and consequently causing said points to move farther apart. The latter action is constantly opposed by the stress inherent in the material of the washer, which is preferably of spring steel developing an enormous stress, and which constrains the points to grip the thread and bite deeply into the same, thereby resisting rotation. It will be evident that as that half of the washer carrying the points A and C is expanded, the point D will be brought into more effective contact with the bolt and contribute to bind the washer. The above described action causes one side of the washer to firmly grip the bolt while the other side is practically left free. This latter side is suspended from the point C and guided by the point B on the opposite face. After the one side of the washer is rendered incapable of further movement due to the binding of the points A, C and D, further pressure of the nut will affect only the opposite or free side, which side is permitted by means of the slot Z, to move with the nut. As this motion continues, the point B is forced more tightly into the thread and the slot closing draws all of the points into a circle of less diameter and results in a positive binding of the washer on the bolt. Upon the closing of the slot, the beveled inner faces of each of the points coact with their respective thread walls to cause the points to ride downwardly into the trough of the thread, thereby offering a motion of the washer opposite to that of the nut in unscrewing from the bolt.

Having now particularly described and ascertained the nature of my said invention, and in what manner the same is to be performed, I declare that what I claim is:—

1. In a nut lock, a split washer adapted to close about the bolt, and a plurality of pointed projections on said washer having beveled inner walls and adapted to engage with the thread of the bolt.

2. In a nut lock, a split washer adapted to close about the bolt, a plurality of projections flush with one face of said washer, and a plurality of projections flush with the opposite face.

3. In a nut lock, a split washer adapted to close about the bolt, a plurality of pointed projections flush with one face of said washer, and a plurality of pointed projections flush with the opposite face of said washer, the inner face of each of said projections being beveled.

4. In a nut lock, a split washer adapted to close about the bolt, a plurality of pointed projections on said washer flush with one face thereof, a pointed projection flush with the opposite face of said washer, and a projection flush with the latter named face located approximately opposite the split portion of the washer and having an elongated chisel point, the walls of each of said projections being beveled.

In testimony whereof, I affix my signature, in presence of two witnesses.

GEORGE SOMERVILLE NORRIS.

Witnesses:
ALEXANDER ANDERSON,
ARTHUR BISHOP.

---

Copies of this patent may be obtained for five cents each, by addressing the "Commissioner of Patents, Washington, D. C."